Jan. 24, 1967   K. BEERLI   3,299,625
DEVICE FOR SECURING A SPINDLE ROTOR TO BEARING MEANS
Filed May 20, 1964
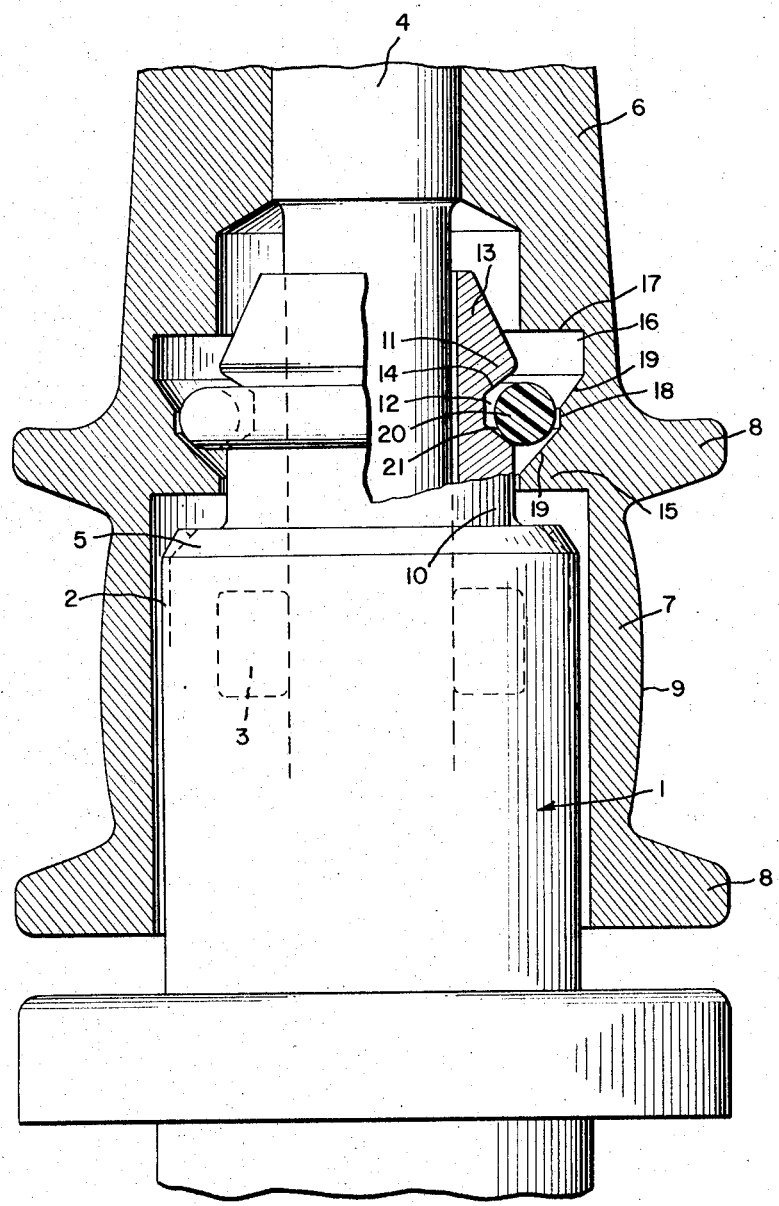
INVENTOR
KARL BEERLI
BY Wenderoth, Lind & Ponack
ATTORNEYS

United States Patent Office 3,299,625
Patented Jan. 24, 1967

3,299,625
DEVICE FOR SECURING A SPINDLE ROTOR
TO BEARING MEANS
Karl Beerli, Zurich, Switzerland, assignor to Spindel-, Motoren- und Maschinenfabrik A.G., Uster, Switzerland
Filed May 20, 1964, Ser. No. 368,957
Claims priority, application Switzerland, May 22, 1963, 6,414/63
2 Claims. (Cl. 57—132)

The invention relates to textile spindles and more particularly to means for securing a spindle rotor against its unintended separation from a bearing means on which it is rotatably supported by axial engagement from above. For example, the rotor may comprise a spindle shaft and a part constituting an integral yarn package supporting cone and driving whirl, and the bearing means may comprise a bearing tube containing a foot bearing and a collar bearing for the said spindle shaft.

In order to prevent such unintended axial separation of the said spindle rotor from the said bearing means, it is usual to provide on the latter a hook the end of which reaches an annular groove or the upper face of an annular shoulder of a rotor part through an axially extending recess as the rotor is being slipped onto or into the bearing means with the rotor maintained in such an angular position that the said hook engages the said recess. As soon as the recess will have moved out of alignment with the hook below the latter due to the rotation of the rotor, the latter is secured against unintended axial displacement on the bearing means and against separation therefrom, provided the rotor does not come to a standstill with its said recess in alignment with the hook. In order to remove the rotor from the bearing means, the rotor must be rotated to produce such alignment again with some accuracy, an operation which takes much time if all the numerous rotors are to be replaced in a large spinning frame. Moreover, this known device cannot be relied upon entirely for preventing separation of the rotor from the bearing means since the rotor may happen to stop in the angular position in which the said recess is in alignment with the said hook.

The invention has for its object to provide a device in which the spindle rotor can be slipped onto or into the bearing means and withdrawn therefrom regardless of its angular position about its axis of revolution, and in which drawing the rotor off the bearing means requires a sufficient effort to preclude unintentional separation of the rotor from the bearing means.

An embodiment of the invention will now be described by way of example only, with reference to the accompanying drawing which shows a portion of a spinning machine spindle.

This spindle comprises a supporting portion generally indicated at 1, which includes a housing 2 containing a collar bearing 3 and a foot bearing (not shown) for the spindle shaft 4. The collar bearing 3 together with a cover piece 5 overlying it are secured in the housing 2 by inward flanging and axial shinking of the uppermost part of the latter's wall, in a manner known in itself and more fully disclosed in my earlier Patent No. 2,777,739 for a Method of Assembling Bearings for Spinning or Twisting Spindles, issued January 15, 1957, to Spindel-, Motoren- und Maschinenfabrik A.G., of Uster, Switzerland.

On the spindle shaft 4 which has been inserted from above into the collar bearing 3 and into the foot bearing (not shown), an externally conical yarn package carrier 6 is mounted. The lower integral part 7 of this carrier is shaped as a driving whirl or pulley with two flanges 8 and an intermediate spherical surface 9 engageable by a driving belt.

In order to limit any undesired axial upward displacement of the rotatable assembly comprising the spindle shaft 4 and the yarn package carrier 6, the part 7 of which forms a driving whirl, the following provisions are made:

The housing cover 5 is provided with an integral upwardly extending element 10 which in its circumference has an annular bulge 11 and below that, an annular groove 12. The upper surface 13 of the annular bulge 11 has the shape of a cone of revolution, the generating lines of which form an angle of about 30° with the spindle axis. The lower surface 14 of the bulge 11, which at the same time is the surface bounding the annular groove 12 upwardly, is in the shape of another cone of revolution the generating lines of which form an angle of about 45° with the spindle axis, that is, a wider angle than the angle formed with that axis by the generating lines of the upper cone 13.

The inner circumferential surface of the yarn package carrier 6 which faces the external surface of the element 10 also presents an annular ridge 15 and above it, an annular groove 16. The upper limiting surface of this annular groove 16 is a plane annular shoulder 17 while its lower limiting surface is a conical surface 19 the generating lines of which form an angle of about 45° with the spindle axis, i.e. a much smaller angle than the generating lines of the surface of the annular shoulder 17, the conical surface 19 is interrupted by a cylindrical step 18.

Between the circumferential surfaces of the two members 6 and 10 which face each other, a rubber ring 20 is interposed. With part of its circular cross-section, this ring 20 engages the annular groove 12 of the element 10, and with another part of its cross-section it engages the annular groove 16 in the internal surface of the yarn package carrier 6. The dimensions of the groove 12 and of the rubber ring 20 are so adapted to each other that in its undeformed condition, the ring 20 has some play in the groove 12 but that it could not or only with extreme reduction and deformation of its cross-section, find space enough in that groove so as no longer to project into, and no longer to engage, the opposite annular groove 16, whereby the annular ridge 15 could be slid past it. However, as will be shown later, this would not be required for removing the carrier 6. On the other hand, the rubber ring 20 in its undeformed condition only loosely engages the annular groove 16. The latter is so wide that mere diametral widening of the ring 20 is required to permit its becoming lodged entirely within the groove 16, so that it can easily be slid over the annular bulge 11 of the element 10.

For assembling the described device, first the rubber ring 20 is inserted into the groove 16 of the yarn package carrier 6 so that it is retained within it with much play. Thereafter, the spindle shaft 4 is inserted into the bearing 3, whereby the element 10 becomes engaged into the lower part 7 of the carrier 6. This element penetrates into the opening surrounded by the annular ridge 15 and behind it, into the rubber ring 20; the latter thereby engages the conical upper surface of the annular bulge 11 and is pressed downwards by the annular surface 17 which limits the groove 16 from above. Since the generating lines of the conical surface 13 form only a small angle with the axis of the spindle, since the surface 17 is perpendicular to that axis, and since the groove 16 is deep enough, the rubber ring 20 is widened so much, without the occurrence of great axial forces, that it easily passes the bulge 11, whereupon it contracts along the conical surface 14 and engages the groove 12 in the surface of element 10.

If, however, an axial force is exerted on the yarn package carrier 6 tending to draw it upwardly off the housing 2, then the conical surface 19 which bounds the groove 16 from below forces the rubber ring 20 upwards and, by producing a radial force component, also inwardly against the lower conical surface 14 of the bulge 11 formed on the nonrotating element 10. The rubber ring 20 then is not expanded but its cross-section is deformed until it more or less fills the groove 12. Thereby, it is more and more displaced into the opposite groove 16 as the yarn package carrier 6 moves upwards, so that finally it becomes forced past the point of largest diameter of the annular ridge 11 and on removal of the yarn package carrier 6 is carried away with it in the annular groove 16.

Therefore, the rotating spindle assembly can be placed on the bearing assembly without the exertion of increased forces; this is an advantage since there are no conditions in which that movement of the rotating assembly should be counteracted. On the other hand, separation of the rotating assembly from the bearing assembly, which could occur when not desired and which therefore should be opposed to such extent that intentional separation of these assemblies is not prevented, will require a certain force acting axially upwards on the yarn package carrier to deform the rubber ring 20. This required force can be given such a value that an attendant can remove the rotating assemblies of a large number of spindles, without becoming unduly tired. Since it is not necessary to give these assemblies a definite angular position, such removal can be effected within a short time.

During operation, the rotation of the rotating assembly is not impeded in any way by the rubber ring 20 and the latter is not subject to wear since it rests on the surface 21 which limits the groove 12 from below, and since it does not contact the surface 19 which similarly limits the groove 16 of the rotating package carrier 6. Such contact is prevented due to the fact that the cylindrical step 18 in the surface 19 has a larger diameter than the outside diameter of the rubber ring 20 and that the inner portion of the surface 19 is sufficiently far below the rubber ring 20.

The invention can be embodied in other forms without departing from its scope and spirit. For example, the outer surface of the inner, non-rotating element could have at its top an annular ridge having substantially the profile of ridge 15 which in the illustrated example is on the inner surface of the rotating carrier 6. Below that ridge, the nonrotating element then could be provided with an annular groove having a profile similar to that of groove 16 while reversely the yarn package carrier could have a conical inner circumferential surface converging upwardly from its lower border with its generating lines forming an angle of about 30° with the axis of the spindle, followed upwardly by a narrow annular groove having the same profile as the groove 12 in the illustrated example. The rubber ring then would be retained on the inner, non-rotating element.

Other analogous embodiments of the invention would result, e.g. in spindles incorporating an electromotor, if the uppermost part of the housing or stator were to surround a central hub-like element axially depending from a rotating yarn package carrier, whereby the rotating element in the device would be the inner one and the nonrotating element containing the bearings would be the outer one.

I claim:

1. In a textile machine comprising a non-rotatable bearing assembly and a rotatable spindle assembly supported thereat, one of said two assemblies comprising the inner one and the other comprising the outer one of a pair of coaxial members having mutually facing circumferential surfaces and axially displaceable in relation to each other, means for preventing unintended axial separation of the said two assemblies, which comprises an annular ridge in each of the said mutually facing circumferential surfaces of the said coaxial members, an annular groove in each of the said surfaces at the rear of the respective annular ridge, a ring of resilient material interposed between the said surfaces of the coaxial members and simultaneously engaging the said annular grooves in the said surfaces of both of the said members, the forward surface of the said ridge of one of the said members forming a smaller angle with the axis of that member than the rearward surface of that ridge forwardly bounding the annular groove of the said one member and the surface rearwardly bounding the annular groove of the other of the said members forming a greater angle with the axis of the said other member than the surface forwardly bounding that annular groove of the said other member, whereby the axial force required for causing the said ring when lodged in the last mentioned annular groove of the said other member to pass over the said ridge of the said one member and into the said annular groove thereof on axial displacement of the said members into each other is smaller than the force required for causing the said ring to pass from the said annular groove of the said one member over the said ridge thereof on axial displacement of the said members out of each other.

2. The means as claimed in claim 1 in which the annular ridge of the said one member has a forwardly tapering conical surface the generating lines of which form an angle comprised between 25° and 35° with the axis of said member and a rearwardly tapering conical surface the generating lines of which form an angle comprised between 40° and 50° with the said axis, and in which the annular groove of the said other member is rearwardly limited by a plane annular surface perpendicular to the axis of said other member and is forwardly limited at least in part by a conical surface the generating lines of which form an angle comprised between 40° and 50° with the said axis.

References Cited by the Examiner

UNITED STATES PATENTS

| 2,894,365 | 7/1959 | Meyer-Busche | 57—132 |
| 2,918,781 | 12/1959 | Bakker | 57—130 |
| 3,012,394 | 12/1961 | Schollkopf | 57—132 |
| 3,056,252 | 10/1962 | Schollkopf et al. | 57—132 |

FRANK J. COHEN, *Primary Examiner.*

J. PETRAKES, *Assistant Examiner.*